(12) United States Patent
Egner-Walter et al.

(10) Patent No.: US 9,440,621 B2
(45) Date of Patent: Sep. 13, 2016

(54) FLAT WIPER BLADE

(75) Inventors: Bruno Egner-Walter, Heilbronn (DE); Michael Schäuble, Vaihingen/Enz (DE)

(73) Assignee: Valeo Systèmes d'Essuyage, La Verrière (FR)

( * ) Notice: Subject to any disclaimer, the term of this patent is extended or adjusted under 35 U.S.C. 154(b) by 677 days.

(21) Appl. No.: 13/257,372

(22) PCT Filed: Apr. 14, 2010

(86) PCT No.: PCT/EP2010/002269
§ 371 (c)(1),
(2), (4) Date: Sep. 19, 2011

(87) PCT Pub. No.: WO2010/121729
PCT Pub. Date: Oct. 28, 2010

(65) Prior Publication Data
US 2012/0005855 A1     Jan. 12, 2012

(30) Foreign Application Priority Data

Apr. 21, 2009   (DE) ........................ 10 2009 017 990

(51) Int. Cl.
*B60S 1/38*     (2006.01)
*B60S 1/52*     (2006.01)

(52) U.S. Cl.
CPC .............. *B60S 1/524* (2013.01); *B60S 1/3808* (2013.01); *B60S 1/3862* (2013.01); *B60S 1/381* (2013.01); *B60S 1/3879* (2013.01)

(58) Field of Classification Search
CPC .... B60S 1/3808; B60S 1/3863; B60S 1/381; B60S 1/3806; B60S 1/46; B60S 1/48–1/488; B60S 1/50; B60S 1/52–1/528
USPC ............ 15/250.01–250.04, 250.32, 250.201, 15/250.43, 250.361, 250.44–250.48
See application file for complete search history.

(56) References Cited

U.S. PATENT DOCUMENTS 4,976,001 A * 12/1990 Wright ........................ 15/250.48
7,540,061 B1 * 6/2009 Huang ..................... 15/250.201
(Continued)

FOREIGN PATENT DOCUMENTS

DE         10335394 A1    9/2004
DE         103 23 998 A1   12/2004
(Continued)

OTHER PUBLICATIONS

DE102006039968A1 (machine translation), 2008.*
(Continued)

*Primary Examiner* — Monica Carter
*Assistant Examiner* — Andrew A Horton
(74) *Attorney, Agent, or Firm* — Osha Liang LLP

(57) ABSTRACT

Flat wiper blade for use in windscreen wiper modules of vehicles, essentially consisting of a wiping rubber in addition to two spring rails, extending in the longitudinal direction of the wiper blade, spaced apart from one another and receiving the wiping rubber in a subsection between them, which each respectively project over the wiping rubber on the wiper blade longitudinal sides and with at least one jet or injection strip provided on one longitudinal side of the wiper blade, having at least one injection or washing duct with a large number of jet or injection openings for application of a washing and cleaning fluid to a vehicle windscreen and which, with use of clip-like fixtures spanning the wiper blade on the upper side of the wiper blade, is retained on the external peripheries of the spring rails.

8 Claims, 9 Drawing Sheets

(56) References Cited

U.S. PATENT DOCUMENTS

| | | | |
|---|---|---|---|
| 2005/0011033 A1* | 1/2005 | Thomar et al. | 15/250.201 |
| 2006/0179597 A1* | 8/2006 | Hoshino et al. | 15/250.43 |
| 2007/0061994 A1* | 3/2007 | Lee | 15/250.201 |
| 2008/0216274 A1* | 9/2008 | Egner-Walter et al. | 15/250.02 |
| 2010/0139026 A1* | 6/2010 | Ku | 15/250.201 |

FOREIGN PATENT DOCUMENTS

| | | | | |
|---|---|---|---|---|
| DE | 10 2004 056 835 A1 | 6/2006 | | |
| DE | 10 2006 013 900 A1 | 9/2007 | | |
| DE | 102006039968 A1 * | 2/2008 | | B60S 1/40 |
| DE | 10 2007 030 169 A1 | 1/2009 | | |
| EP | 1178907 B1 | 4/2006 | | |
| EP | 1837257 A2 * | 9/2007 | | B60S 1/38 |
| EP | 1 918 167 A1 | 5/2008 | | |
| FR | 2 648 771 A1 | 12/1990 | | |
| JP | 2006008025 A * | 1/2006 | | B60S 1/38 |
| JP | 2008221893 A * | 9/2008 | | B60S 1/38 |
| WO | 01/51323 A1 | 7/2001 | | |

OTHER PUBLICATIONS

Definition of Spoiler in the Free Online Encyclopedia, 2014.*
JP2008221893 (machine translation), 2008.*
JP2006008025 (machine translation), 2006.*
International Search Report issued in PCT/EP2010/002269, mailed on Mar. 11, 2011, 5 pages.

* cited by examiner

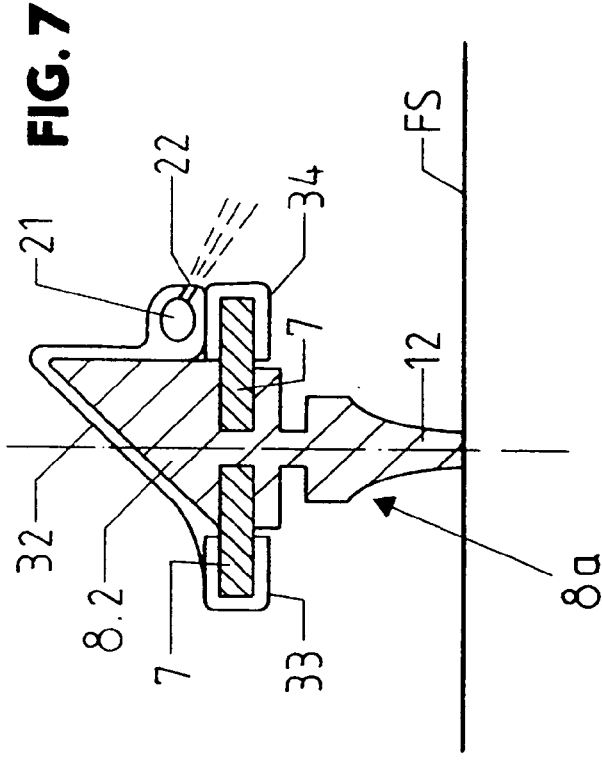
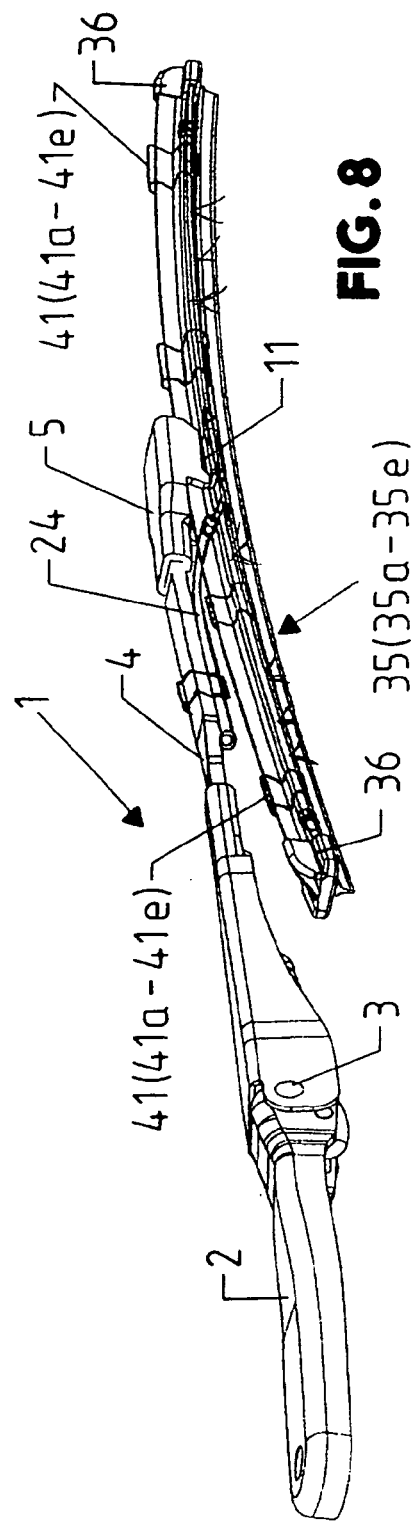

FLAT WIPER BLADE

The invention refers to a flat wiper blade according to the generic term in patent claim 1 or 8 and in this case specifically to a flat wiper blade having at least one injection or washing duct on at least one longitudinal side of the wiper blade, presenting a large number of jet or injection openings for application of a washing and cleaning fluid to a vehicle windscreen.

Flat wiper blades are known in various different embodiments. Flat wiper blades are also particularly known (DE 103 35 394 A1) having two flat spring rails spaced apart from each other extending in the longitudinal direction of the wiper blade and a wiping rubber forming the wiping lip, wherein the spring rails are respectively received over part of their width in grooves on the longitudinal sides of the wiping rubber and therefore receive the wiping rubber between them in a wiping rubber section remaining between the grooves. A profile constructed as a spoiler (spoiler profile) is fixed to the external peripheries of the spring rails facing away from the wiping rubber.

Flat wiper blades are furthermore known (DE 10 2006 013 900 A1) having a spoiler-like-shaped wiper blade body, formed of a length of a solid plastic profile, which, on the external peripheries of two spring rails facing away from the wiping rubber, is retained spanning these peripheries. The wiper blade body is provided on both longitudinal sides of the wiper blade respectively with injection and washing ducts presenting a large number of jet or injection openings. Disadvantageous among other aspects are the high mass and impaired flexibility of the wiper blade determined by the solid, spoiler-like wiper blade body.

Wiper blades are furthermore known (DE 10 2007 030 169 A1) having a single flat spring rail surrounded by the wiping rubber and with a spoiler profile forming the upper side of the wiper blade, which (spoiler profile) on the profile section of the wiping rubber surrounding the spring rail, is retained positively spanning the wiping rubber in the manner of a slide on the upper side of the wiper blade. The flat wiper blade presents on at least one longitudinal side of the wiper blade an injection strip manufactured in one piece with the spoiler profile with an injection and washing duct having a large number of jets or injection openings.

Flat wiper blades are furthermore known (EP 1 178 807 B1) with two spring rails and a wiping rubber received between the spring rails, which forms the wiping lip on the underside of the wiper blade and is constructed shaped as a spoiler, i.e. with a spoiler-like profile section, on the upper side of the wiper blade. A jet or injection strip is fixed respectively to the projecting spring rails with an injection or washing duct having a large number of jets or injection openings and to be more precise with a fastening section spanning the external periphery of the spring rail in question in the manner of a clip. In order to secure the respective injection or jet strips, openings are provided in the projecting spring rails, in which projections on the fastening sections of the jet strips engage and lock. Disadvantageous in this case is elaborate assembly owing to a large number of individual components and particularly also the fact that differences in colour in the case of the large number of the individual parts cannot be avoided and therefore the uniform appearance also sought for the colouring of the wiper blade cannot be achieved.

Flat wiper blades are furthermore known (EP 1 918 167*), presenting an injection or washing duct having a large number of jet or injection openings on a longitudinal side of the wiper blade, with this injection and washing duct being formed of a tube, which is retained by several clip-like fixing elements spaced apart from one another in the longitudinal direction of the wiper blade and spanning the upper side of the wiper blade. Disadvantageous in this case is particularly the relatively large amount of expenditure in terms of assembly and the associated high assembly costs due to a large number of individual components.

The purpose of the invention is to demonstrate a flat wiper blade provided on at least one longitudinal side of the wiper blade with an injection or washing duct having a large number of jet or injection openings and presenting improved visual and/or mechanical properties with simplified assembly.

In order to solve this problem, a flat wiper blade according to patent claim 1 or 8 is developed.

According to one aspect of the invention, at least one spoiler element is provided on the upper side of the wiper blade, which is constructed in one piece with at least one jet or injection strip extending in the assembled state along a longitudinal side of the wiper blade. The particularity of the wiper blade in this case lies in the fact that the spoiler element is designed in the manner of a shell and to be more precise in such a manner that for its fastening to both longitudinal sides of the wiper blade, it directly or however indirectly spans the external peripheries of the spring rails. As a result of the shell-shaped embodiment of the spoiler element, a construction of the wiper blade with reduced mass and with a flexibility unimpaired by the spoiler element is possible.

The shell-like spoiler element possesses a wall thickness that is for example of the order of magnitude of the spring rail thickness, i.e. of the order of magnitude of the thickness of the flat material used to manufacture the spring rails; preferably, the wall thickness of the shell-like spoiler element is at the most identical to or however less than the spring rail thickness.

The possibility fundamentally exists of supporting the spoiler element internally and to be more precise for example by means of an internal supporting profile or supporting element extending over the entire length of the spoiler element, or however also only partially by means of supporting elements spaced apart from one another in the longitudinal direction of the wiper blade. The supporting profile is then for example an independent, hollow profile or hollow chamber profile externally retained on the spring rails. The shell-like spoiler element is then retained spanning this supporting profile in the area of the spring rails indirectly on this supporting profile. The supporting profile may also be formed of a spoiler-like profile section of the wiping rubber itself.

According to another aspect of the invention, a jet or injection strip is fixed to at least one longitudinal side of the wiper blade, presenting at least one injection or washing duct with a large number of jet or injection openings for application of the washing and cleaning fluid.

The jet or injection strip is constructed in one piece with a fastening section, by means of which it is retained on the wiper blade in the area of the external edge of a spring rail and preferably extending over the entire or essentially the entire length of the jet or injection strip. The at least one jet or injection strip is secured by several clip-like or clasp-like securing elements spaced apart from one another in the longitudinal direction of the wiper blade, which span the at least one jet or injection strip in addition to the wiper blade on its upper side and are retained positively and preferably by locking on the wiper blade in the area of the spring rails. The clip-like or clasp-like securing elements are not an integral part of the at least one jet or injection strip, but independent, thin-walled elements. If the wiper blade is constructed as a spoiler at least in subareas on the upper side of the wiper blade, the clip-like or clasp-like securing elements at this position are adapted in shape to the spoiler profile.

Further developments, advantages and application possibilities of the invention are also apparent from the following description of examples of embodiment and from the figures. In this case, all the characteristics described and/or illustrated are in themselves or in any desired combination fundamentally a subject of the invention, regardless of their summary in the claims or their backward relation. The contents of the claims are also made an integral part of the description.

The invention is described below in further detail in examples of embodiment based on the figures:

FIG. 3-7 shows simplified representations of a section through the wiper blade in FIGS. 1 and 2 respectively with different embodiments of the invention;

FIG. 8 shows a perspective representation of a wiper arm together with a wiper blade fixed to one end of the wiper arm in a further general embodiment of the invention;

Figure 1:
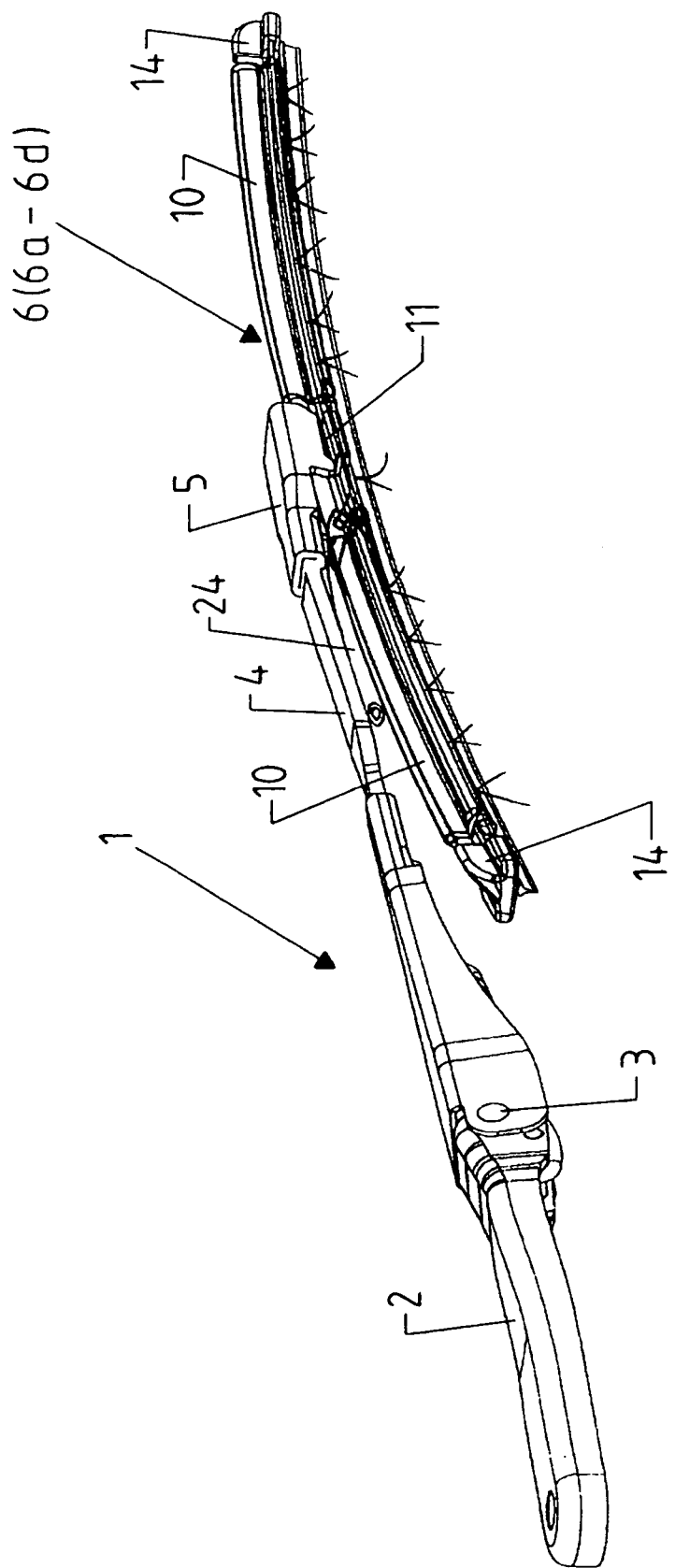
FIG. 1 shows a perspective representation of a wiper arm together with a flat wiper blade fixed to this wiper arm, which is constructed as an aqua wiper blade, with a spoiler and at least one injection or washing duct on at least one longitudinal side of the wiper blade.
Figure 2:
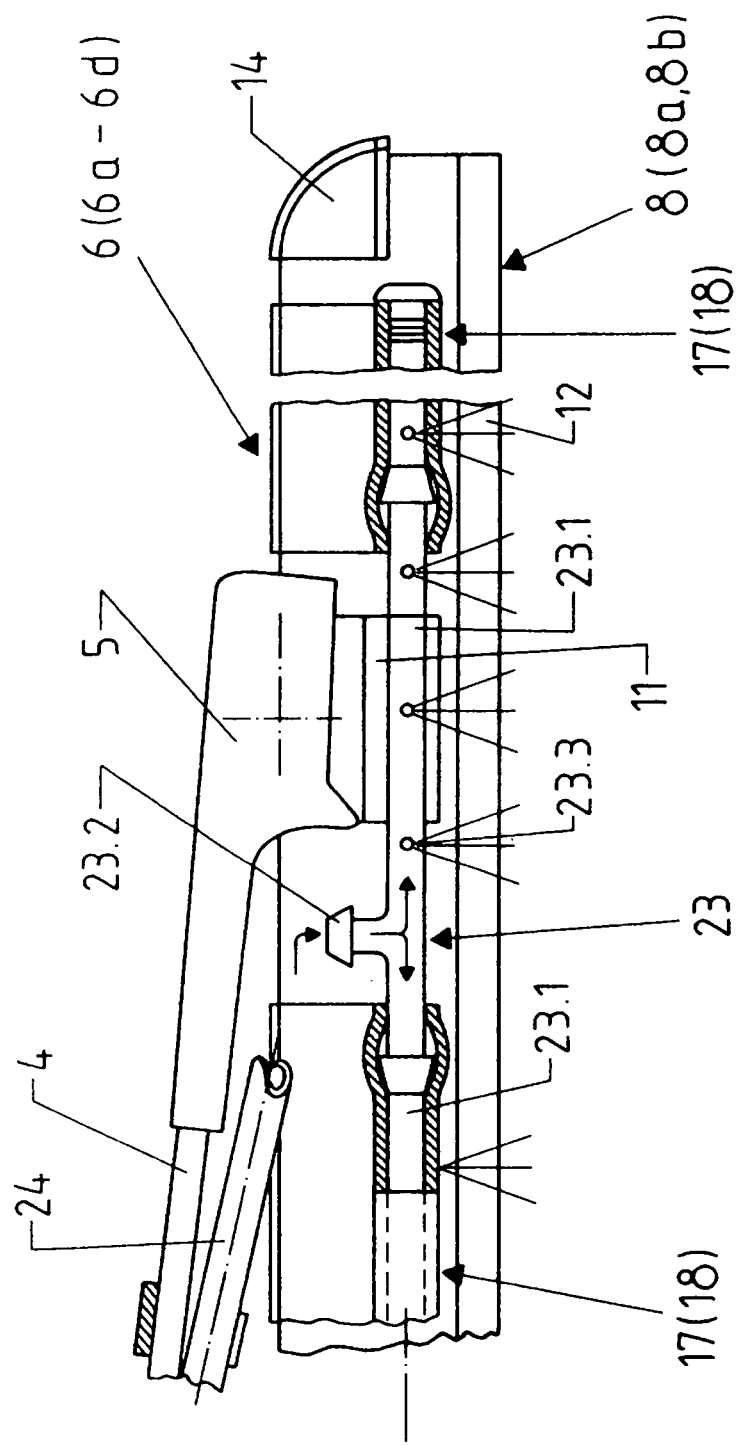
FIG. 2 shows a lateral view of the wiper blade in FIG. 1 together with the wiper arm end bearing this wiper blade.
Figure 3:
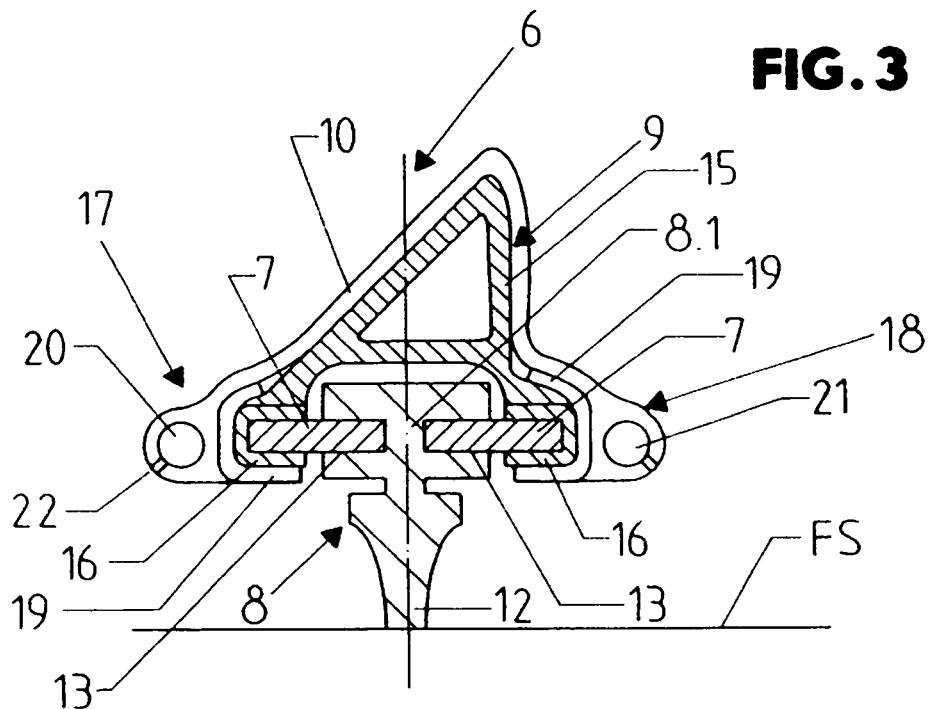

In FIGS. 1-7, 1 is the wiper arm of a windscreen wiper module for vehicle windscreens FS, particularly vehicle front windscreens. The wiper arm 1 consists in the well known manner of a pivot section 2, by means of which the wiper arm 1 can be mounted on a wiper shaft not illustrated, in addition to a wiper arm element 4 (wiper rod) articulated on the pivot section 2 by means of a wiper arm link 3, which (wiper arm element) is provided on its end distant from the pivot section 2 with an adapter 5 on the wiper arm side for detachable flexible fixing of a wiper blade, for example the wiper blade 6 in FIG. 3.

The wiper blade 6 is constructed as a flat wiper blade and comprises for this purpose at least two flat spring rails 7, manufactured from a sprung metallic material, for example spring steel, a wiping rubber 8, two spoiler-like-shaped, strip-like supporting elements 9, two shell-like spoiler elements 10 forming the upper side of the wiper blade 6, in addition to a wiper blade adapter 11 for detachable flexible connection to the adapter 5.

The two spring rails 7 and the wiping rubber 8, which forms the wiping lip 12 in contact with the vehicle windscreen FS at least during wiping operation, respectively extend over the entire length of the wiper blade 6, with a part of the width of each spring rail 7 reaching into a groove 13 provided on one longitudinal side of the wiping rubber 8 and to be more precise in such a manner that the spring rails 7 receive the wiping rubber 8 between each other in the area of a section 8.1 of reduced width.

The adapter 11 on the wiper blade side is fastened in the middle or approximately in the middle of the wiper blade 6 to the peripheries of the spring rails 7 projecting laterally from the wiping rubber 8 and to be more precise surrounding the spring rails 7 at these peripheries and spanning in the manner of a slide the wiper blade 6 and the part of the wiper blade 6 formed by the spring rails 7 and the wiping rubber 8 on the upper side of the wiper blade facing away from the wiping lip 12. The supporting elements 9, spoiler-like-shaped and manufactured for example from plastic as a hollow profile and the shell-like spoiler elements 10 likewise manufactured from plastic and covering a supporting element respectively in the assembled state each extend starting from a front side of the adapter 11 on the wiper blade side to the end of the wiper blade 6 opposite this front side. Cover caps 14 formed of plastic for example are provided at both ends of the wiper blade 6, which not only serve for a visually appealing conclusion to the wiper blade 6 at the wiper blade ends, but simultaneously also hold together the elements of the wiper blade 6 at this position, i.e. the two spring rails 7, the wiping rubber 8, the supporting element 9 and the spoiler element 10.

Each supporting element 9 is in one piece, consisting of a spoiler-like hollow profile 15 with a reinforcing ridge and is constructed with two U-shaped fastening sections 16 extending respectively along a longitudinal side of the supporting element 9, which for fixing of the respective supporting element 9, positively span in the assembled state the two spring rails 7 at their peripheries external in relation to the wiping rubber 8. The fastening sections 16 consist in this case of a plastic for example that presents a greater hardness in comparison to that used for the hollow profile 15.

Each supporting element 9 is covered by one of the spoiler elements 10, which is constructed of a suitable plastic in a shell-like manner following the spoiler-like outer contour of the supporting element 9 and forms the outer surface of the upper side of the wiper blade 6 designed as a spoiler. The shell-like spoiler element 10 respectively possesses a wall thickness equal to or less than the thickness of the spring rails 7. For fastening, the spoiler element 10 is constructed in one piece with two fastening sections 17 and 18, which in the assembled state of the spoiler element 10, span the supporting profile 9 in the area of its fastening section externally in a U-shape. In the area of the fastening sections 17 and 18, each spoiler element 10 is provided for example with a U-shaped or C-shaped profile section 19, which spans the supporting element 9 and reinforces the respective fastening section 17 and 18.

The particularity of the wiper blade 6 lies in the fact that each spoiler element 10 is constructed in the area of its fastening sections 17 and 18 as a jet or injection strip with one injection or washing duct 20 and 21 respectively, which extends over the entire length of the respective spoiler element 10 and respectively presents a large number of jet or injection openings 22 for application of a washing and cleaning fluid (water with cleaning and/or antifreeze additives if necessary) to the vehicle windscreen FS.

At each wiper blade end, the injection and washing ducts 20 and 21 are closed by the cover cap 14 at this position. In the middle of the wiper blade, i.e. in the area of the adapter 11 on the wiper blade side, the injection or washing ducts 20 and 21 formed on each longitudinal side of the wiper blade are connected to one another by means of a connecting piece 23 formed of a T tube and also with a tube line 24 for supplying the washing and cleaning fluid under pressure. The connection is for instance such that the injection ducts 20 on one longitudinal side of the wiper blade 6 are connected with a tube line 23 and the injection ducts 21 on the other longitudinal side of the wiper blade 6 are connected with a separate tube line 23, so that application of the washing and cleaning fluid independently from the direction of movement of the wiper blade 6 is possible on wiping, for example in such a manner that application of the washing and cleaning fluid to the vehicle windscreen FS occurs in each case ahead of the wiper blade 6.

In the embodiment presented, the connecting pieces 23 are respectively constructed as T pieces and to be more precise with a tube section 23.1 extending in the longitudinal direction of the wiper blade and connected at both ends with one injection or washing duct 20 and 21 respectively and with a tube section 23.2 extending away radially from the former tube section for connection of the tube line 24. Other embodiments of the connecting piece 23 are also of course conceivable, for example as a Y connector, i.e. in such a form that the tube section 23.2 projects away at an angle from the tube section 23.1 and to be more precise, adapted to the course that the tube line 24 presents at its end connected to the respective distribution and connecting piece 23.

It is also preferable to provide the connecting piece 23 and the latter's tube section 23.1 with a large number of injection and jet openings 23.3, so that continuous emergence of the spray or washing fluid on each longitudinal side of the wiper blade is possible over the entire length of the wiper blade.

Figure 4:
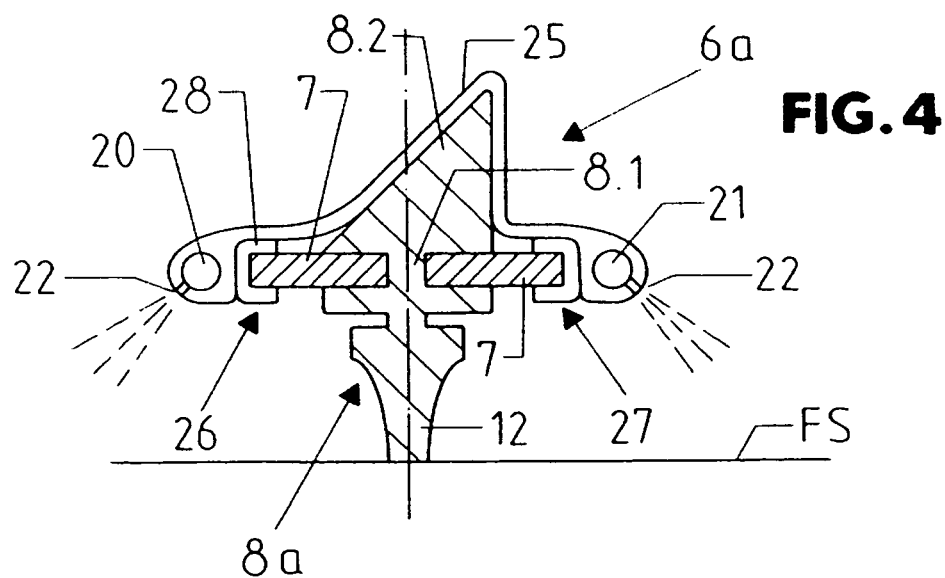

FIG. 4 shows a wiper blade 6a as a further embodiment, which differs from the wiper blade 6 in that in the case of the wiper blade 6a, the internal supporting elements 9 have been omitted and the wiping rubber 8a is constructed with a spoiler-like profile section 8.2 instead, which on the upper side facing away from the wiping lip 12 on both sides of the wiper blade adapter is covered by a shell-like, thin-walled spoiler element 25 respectively, which forms the outer surface of this wiper blade 6a at this position and is directly retained by two fastening sections 26 and 27 on the external peripheries of both spring rails 7. For this purpose, the respective spoiler element 25 is provided, at the fastening sections 26 and 27 respectively, with a reinforcing profile 28 surrounding the spring rail 7 involved on its external edge and extending over the entire longitudinal side of the spoiler element 25. Furthermore, the one-piece spoiler element 25 is designed in turn at its fastening sections 26 and 27 as a jet or injection strip with the injection or washing ducts 20 and 21 presenting the injection openings 22.

Analogously to the wiper blade 6, the wiper blade 6a also presents a spoiler element 25 respectively on both sides of the wiper blade adapter 11, extending from the wiper blade adapter 11 to the end of the wiper blade opposite to the latter.

Figure 5:
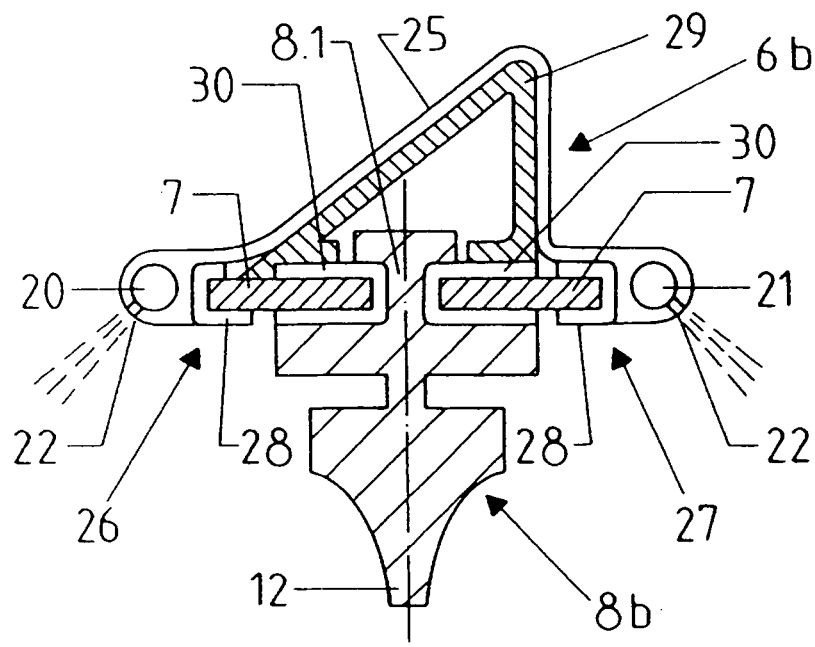

FIG. 5 shows a wiper blade 6b as a further embodiment, essentially consisting of the wiping rubber 8b, the two spring rails 7 respectively engaging in a groove 13 of the wiping rubber 8b, of the internal, spoiler-like-shaped, shell-like supporting elements 29 and of the external spoiler elements 25, which are constructed in one piece with the U-shaped reinforcing profiles 28 and the injection or washing ducts 20 and 21 presenting the injection openings 22. As in the case of the wiper blade 6a, the spoiler elements 25 provided on both sides of the wiper blade adapter 11 with their fastening sections 26 and 27 and with the reinforcing profiles 28 at this position on the external peripheries of the spring rails facing away from the wiping rubber 8b are directly retained surrounding these peripheries. The internal supporting elements 29 are constructed in one piece with U-shaped fastening sections 30, which surround the spring rails 7 at their internal peripheries in relation to the wiping rubber and to be more precise within the grooves 13 of the wiping rubber 8b partially receiving the spring rails 7.

Figure 6:
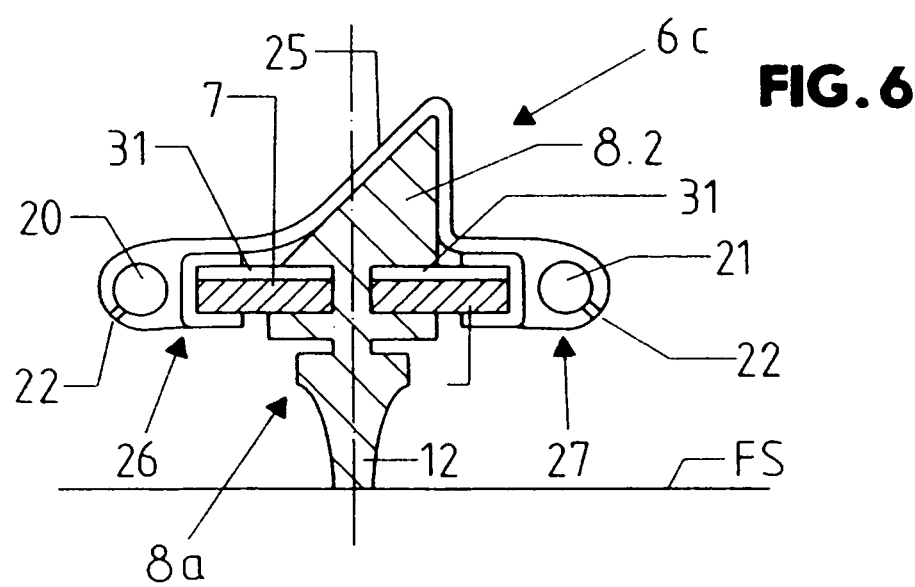

FIG. 6 shows a wiper blade 6c as a further embodiment, which differs from the wiper blade 6a in that on the upper side of the spring rails 7 facing away from the wiping lip, a heating foil 31 is respectively provided for electrically heating the wiper blade 6c and particularly also the injection or washing ducts 20 and 21, which reaches into the corresponding groove 13 of the wiping rubber 8a and is surrounded by the reinforcing profiles 28 of the fastening sections 26 and 27 at the external peripheries of the spring rails 7 which form the jet or injection strips presenting the injection or washing ducts 20 and 21.

FIG. 7 shows as a further embodiment a wiper blade 6a, which essentially differs from the wiper blade 6a in that although the respective thin-walled and shell-shaped spoiler element 32 covering the spoiler-like profile section 8.2 of the wiping rubber 8a is once again retained with the fastening sections 33 and 34 directly spanning the spring rails at their external peripheries, it only presents the injection or washing duct 21 on one longitudinal side of the wiper blade. This injection and washing duct 21 is provided in this case above the upper side of the right spring rail facing away from the wiping lip 12 in FIG. 7 and to be more precise on the longitudinal side of the wiper blade on which the wiper blade has its greatest height owing to its spoiler-like upper side of the wiper blade.

Figure 9:
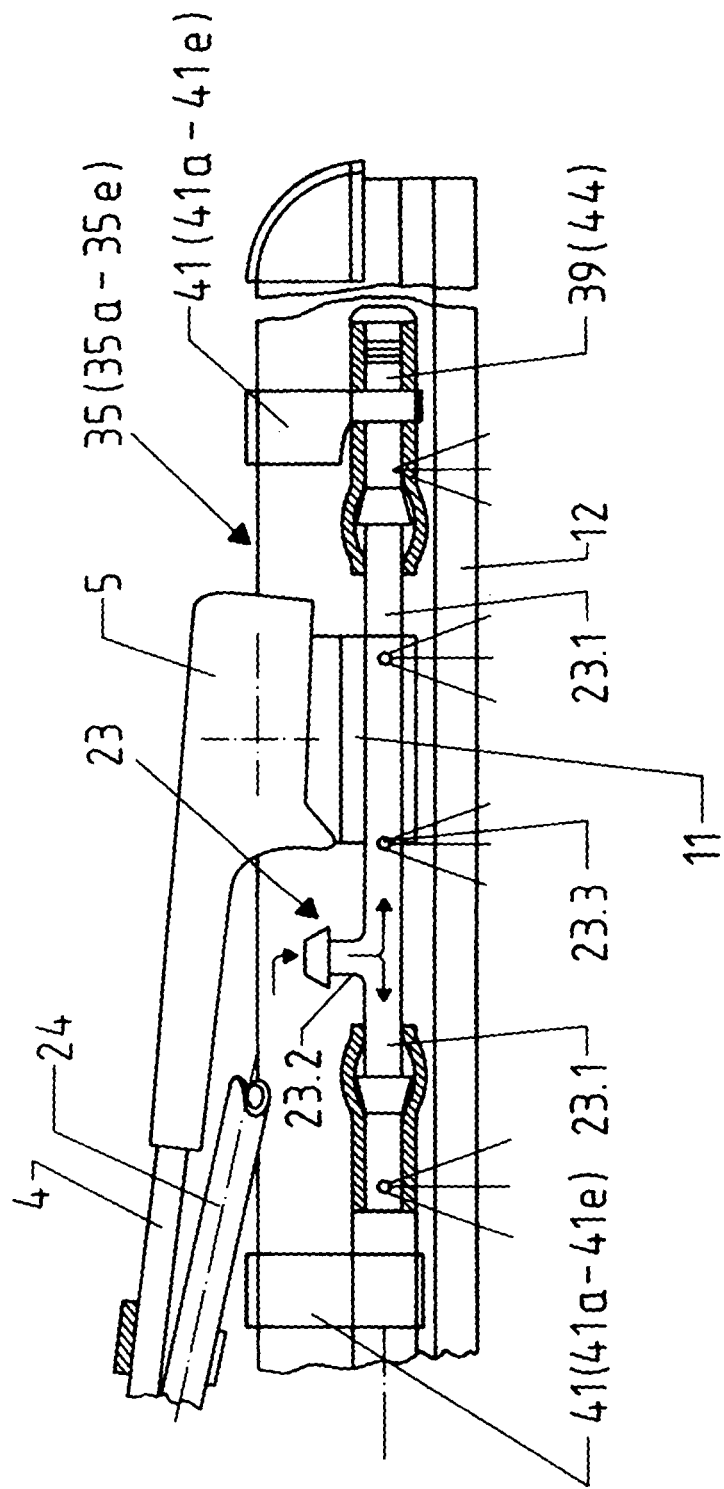
FIG. 9 shows a side view of the wiper blade in FIG. 7, together with the wiper arm end bearing the wiper blade.
Figure 10:
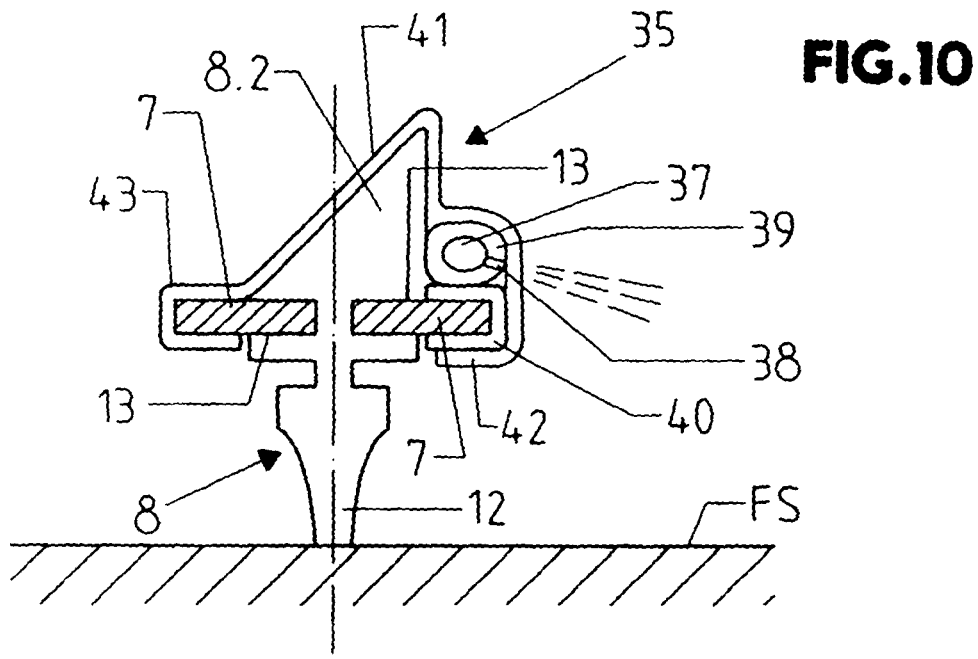
FIG. 10-15 show simplified representations respectively of a section through the wiper blade in FIGS. 8 and 9 with different embodiments of the invention.

FIGS. 8 and 9 once again show the wiper arm 1 together with a wiper blade fastened to this wiper arm 1, for example the wiper blade 35 in FIG. 10, which (wiper blade) is once again constructed as a flat wiper blade and accordingly consists essentially of the two flat, spring rails 7 manufactured from a sprung metallic material, for example spring steel and of the wiping rubber 8a manufactured from a profile made of elastic rubber material, which forms the wiping lip 12 in contact with the vehicle windscreen FS at least during wiping operation and is provided with grooves 13 into which the spring rails 7 reach with a part of their width, so that the wiping rubber 8a is received between the spring rails 7 with the section 8.1 of reduced width. The wiping rubber 8a is designed on the upper side facing away from the wiping lip 12 with the spoiler-like profile section 8.2. In the middle, or approximately in the middle of the wiper blade 35, the wiper blade adapter 11 serving for fastening to the wiper arm 1 and to the adapter 5 at this position is once again provided and to be more precise spanning the two spring rails 7 at their external peripheries and also the wiper blade 35 overall on the upper side of the wiper blade. At both ends, the wiper blade 35 with the cover caps 14 corresponding to the cover caps 36 is provided, which forms a visual conclusion and simultaneously hold together the elements of the wiper blade 35, i.e. the wiping rubber 8a and the spring rails 7.

On both sides of the wiper blade adapter 11, two jet or injection strips 39, each respectively forming an injection duct 37 having a large number of injection openings 37.1 are provided. The jet or injection strips 39 are each constructed in one piece with a U-shaped fastening section 40, extending over the entire length of the respective jet or injection strip 39, by means of which the respective jet or injection strip 39 is retained on a spring rail 7 by pushing on to the periphery of the latter external in relation to the wiping rubber 8a. The fastening is of such a nature that the injection duct 37 is located above the upper side of the spring rail 7 in question facing away from the wiping lip and to be more precise within the corner area formed between the upper side of the spring rail 7 and the spoiler-like profile section 8.2 on the longitudinal side of the wiper blade on which the wiper blade 35 has its greatest height owing to the spoiler-like construction. The respective injection strip 39 is secured on the wiper blade 35 by means of several clips 41, manufactured from a suitable material, for example from a metallic material or plastic. Each clip 41 is constructed such that the latter, on one longitudinal side of the wiper blade, spans the injection strip 39 and the fastening section 40 with a U-shaped retaining section 42 and on the other longitudinal side of the wiper blade, spans the spring rail 7 at this position on the latter's external periphery by a U-shaped retaining section 43. Between the two retaining sections 42 and 43, each clip 41 is shaped according to the outer contour of the spoiler-like profile section 8.2.

On both wiper blade ends, the injection or washing ducts 37 are closed in a suitable manner. In the centre of the wiper blade 35, i.e. in the area of the wiper blade adapter 11, the injection ducts 37 are connected to one another by means of the connecting piece 23 and also to the tube line 24 for supplying the washing and cleaning fluid, with the tube section 23.1 preferably being likewise equipped with injection openings 23.3. In the embodiment presented, the connecting piece 23 is constructed as a T piece and to be more precise with a tube section 23.1 extending in the longitudinal direction of the wiper blade and connected at both ends to a tube section 23.1 with one injection or washing duct 37 respectively and with a tube section 23.2 extending away radially from the former tube section for connection of the tube line 24. Other embodiments of the connecting piece 23 are also of course conceivable, for example as a Y connection piece, i.e. in such a form that the tube section 23.2 projects away at an angle from the tube section 23.1 and to be more precise, adapted to the course that the tube line 24 presents at its end connected to the respective distribution and connecting piece 23

Figure 11:
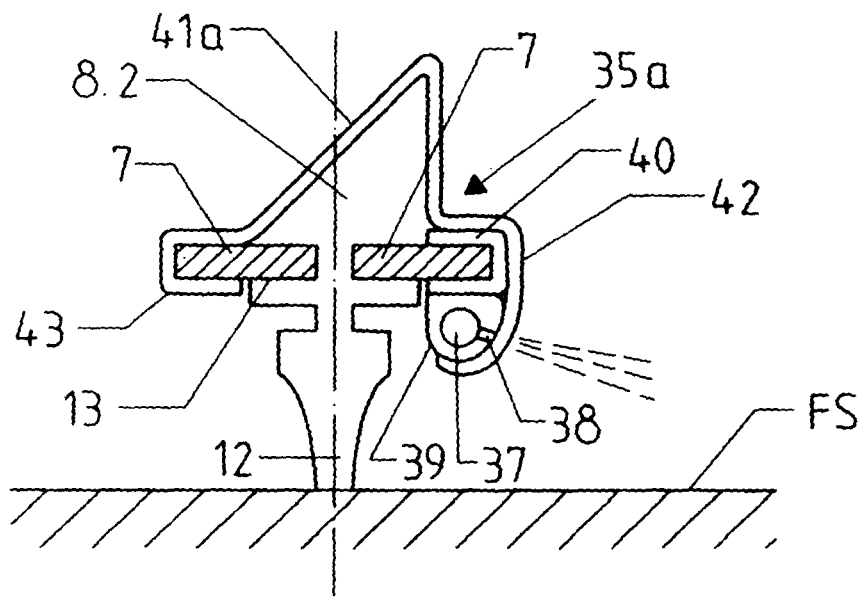

FIG. 11 shows a wiper blade 35a as a further embodiment, which essentially differs from the wiper blade 35 only in that the jet or injection strips 39 are fastened on the one longitudinal side of the wiper blade and on the spring rail 7 at this position in such a manner that the respective injection or washing duct 37 is located underneath the underside of the spring rail 7 facing towards the wiping lip 12. Clips 41a serve in order to secure the two injection strips 39 extending once again between the wiper blade adapter 11 and one end of the wiper blade 35a respectively, which (clips) secure by means of a clipping or retaining section 42 the respective injection strip 39 on one longitudinal side of the wiper blade and span by means of the clipping or retaining section 43 the spring rail 7 on the other longitudinal side of the wiper blade, thereby securing the injection strips 39 on the wiper blade 35a.

Figure 12:
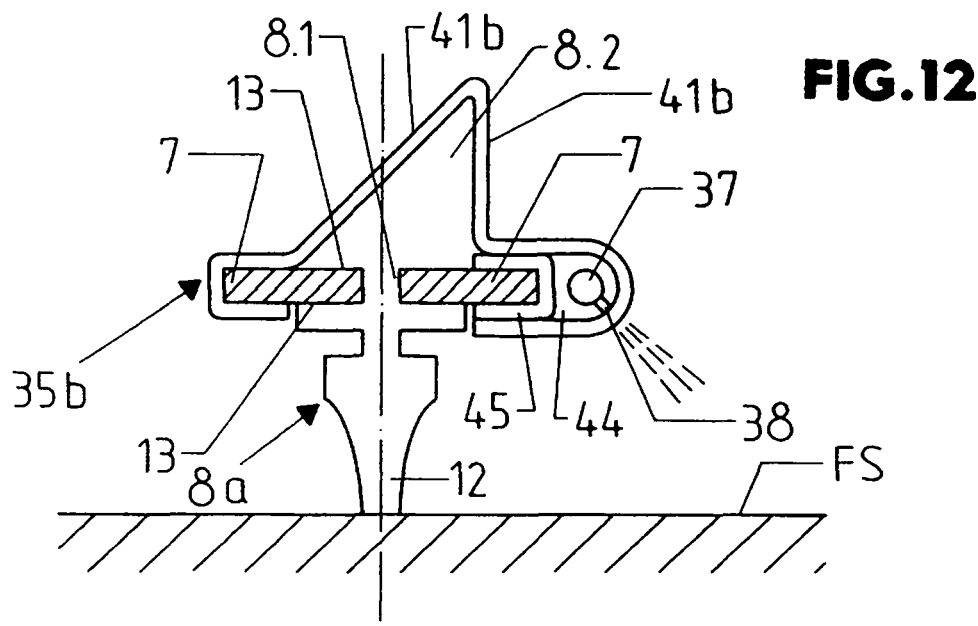

FIG. 12 shows a wiper blade 35b as a further embodiment, which essentially differs from the wiper blade 35 in that instead of the injection strips 39, injection strips 44 are provided that once again form an injection duct 37 with a large number of jet or injection openings 38 and are fastened by a U-shaped fastening section 45 to the external periphery of the spring rail on the longitudinal side of the wiper blade on which the wiper blade, owing to a spoiler-like construction, has the greatest height. The injection strips 44 are constructed in such a way in this case that the respective injection or washing duct 37 is arranged at the same level or approximately the same level as the adjacent spring rail 7 and is therefore located to the side of the spring rail 7.

The injection strips 44 are retained on the wiper blade 35b by several clips 41b spanning the injection strips on one longitudinal side of the wiper blade and the spring rail 37 on the other longitudinal side of the wiper.

Figure 13:
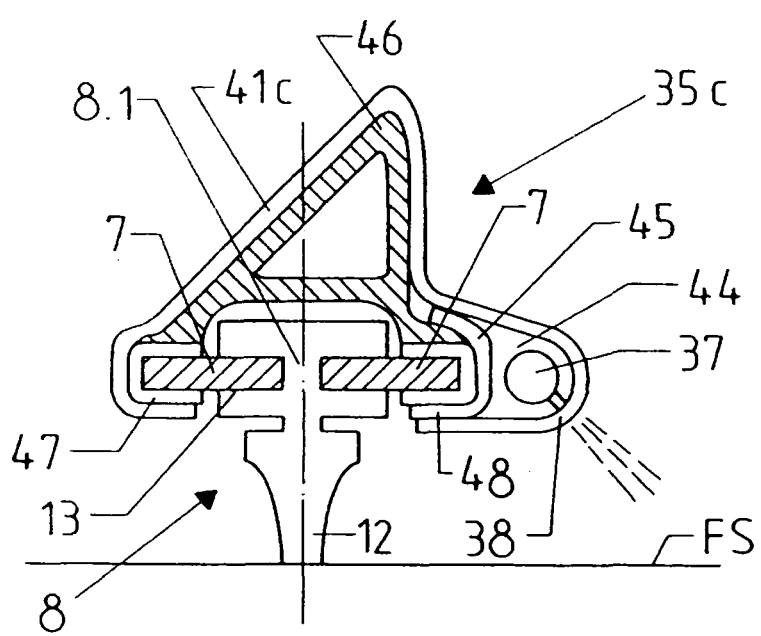

FIG. 13 shows a wiper blade 35 which essential differs from the wiper blade 35b in that the wiping rubber 8 does not present the spoiler-like section 8.2 and a spoiler profile 46 constructed as a hollow profile is fastened on the upper side of the wiper blade on both sides of the wiper blade adapter 11 and to be more precise in such a manner that this spoiler profile is constructed in one piece with two U-shaped fastening sections 47 and 48, which in the assembled state span the external peripheries of the spring rails 7.

On one longitudinal side of the wiper blade and to be more precise on the longitudinal side of the wiper blade with the greatest height, the jet or injection strip 44 with an adapted fastening section 45 is once again provided, which spans the fastening section 48 of the spoiler profile 46. The two injection strips 44 are secured on the wiper blade 35c by several adapted retaining clips 41c, with the retaining clips 41c also serving to secure the respective spoiler profile 46.

Figure 14:
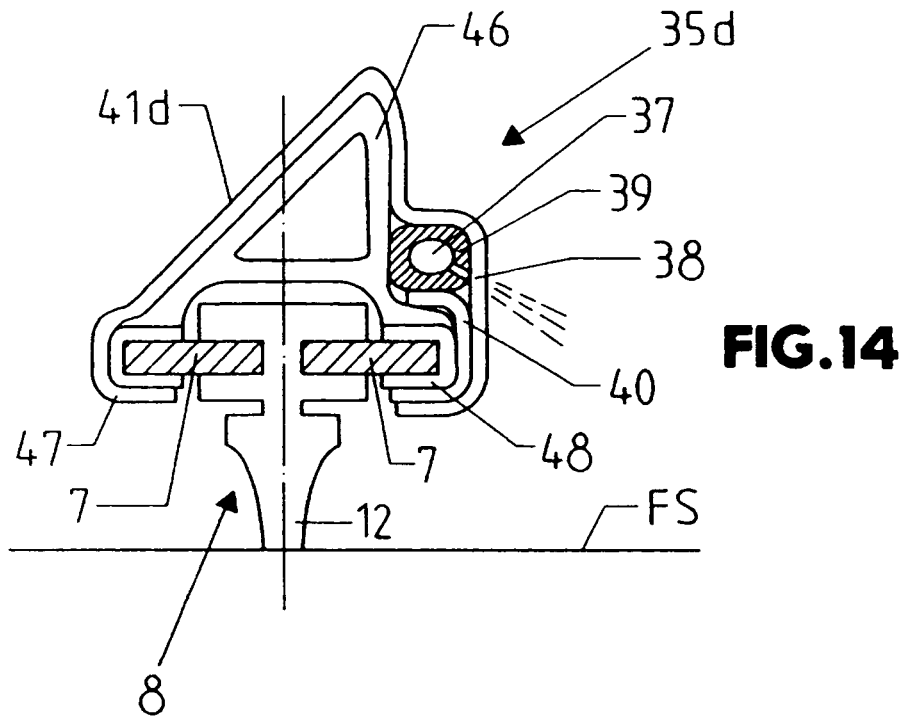

FIG. 14 shows a wiper blade 35d as a further embodiment, which essentially only differs from the wiper blade 35c in that instead of the jet or injection strip 44, a jet or injection strip 39 with an adapted fastening section 40 spanning the fastening section 48 is provided and for securing the injection strips 39, adapted clips 41d spanning the upper side of the wiper blade are provided.

Figure 15:
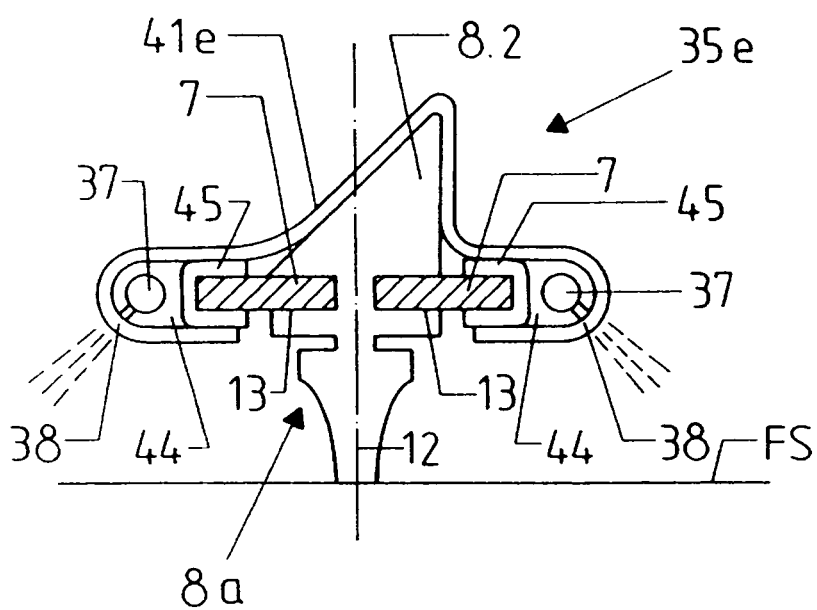

FIG. 15 finally shows a wiper blade 35e, which essentially only differs from the wiper blade 35b in that one both longitudinal sides of the wiper blade respectively, jet or injection strips 44 are provided that are retained at this position by means of their fastening sections 45 on the external periphery of a spring rail 7 and are secured by several clips 41e, which respectively span the injection strips 44 with their U-shaped clip ends and secure these injection strips on the spring rails 7. The wiper blade 35e therefore presents an injection duct 37 respectively on both longitudinal sides of the wiper blade having a large number of injection openings 38. The injection ducts 37 on each longitudinal side are connected to one another by means of a connecting piece or connector 23 and to a tube line 24 for supplying the washing and cleaning fluid.

The invention has been described above based on examples of embodiment. It is understood that modifications and variations are possible without departing as a result from the concept on which the invention is based.

It has been assumed above that the flat wiper blade presents two separate spring rails 7 respectively. Fundamentally, these spring rails may also be the component of a spring rail element, of fork-like design for example and to be more precise with two fork arms formed of one spring rail respectively, connected to each other at one end of the spring rail element. The possibility also exists of designing the strip-like spring rail element with an elongated hole, so that one spring rail 7 respectively is formed on both sides of this elongated hole.

LIST OF REFERENCES

1 wiper arm
2 pivot section
3 wiper arm link
4 wiper arm element or wiper rod
5 adapter on wiper arm side
6, 6a-6d wiper blade
7 spring rail
8 wiping rubber
8.1, 8.2 wiping rubber section
9 internal supporting element
10 spoiler element 11 wiper blade adapter
12 wiping lip
13 groove for spring rail 7
14 cover cap
15 hollow profile
16, 17, 18 fastening section
19 strip-like reinforcing profile
20, 21 injection or washing duct
22 injection opening
23 distribution or connecting piece
23.1, 23.2 tube section of the connecting piece 23
23.3 injection opening in the tube section 23.1
24 tube line
25 spoiler element
26, 27 fastening section
28 strip-like reinforcing profile
29 supporting element or profile
30 fastening section
31 heating film
32 spoiler element
33, 34 fastening section
35, 35a-35e flat wiper blade
36 end cap
37 injection duct
37.1 injection openings
38 injection opening
39 injection strip
40 U-shaped fastening section
41, 41a-41e fastening clip or clasp
42, 43 clip section
44 injection strip
45 fastening section
46 spoiler profile
47, 48 U-shaped fastening section of the spoiler profile 46

The invention claimed is:

1. A flat wiper blade, designed as a spoiler over at least a sub-length of the wiper blade on an upper side of the blade, comprising:
at least one wiping rubber forming a wiping lip;
two spring rails, extending in the longitudinal direction of the wiper blade, spaced apart from one another and receiving the wiping rubber in an area of a subsection between them,
wherein the at least two spring rails laterally project over the wiping rubber as a supporting element; and
wherein the at least two spring rails extend laterally beyond grooves in the wiping rubber, the grooves enclosing portions of the at least two spring rails; and
at least one jet or injection strip provided on at least one longitudinal side of the wiper blade, which forms at least one injection or washing duct presenting a large number of injection openings and is fastened in an area of a peripheral edge of one of the spring rails,
wherein the at least one jet or injection strip is designed in one piece with a shell-shaped spoiler element forming an outer shell enclosing a spoiler-shaped supporting element of the wiper blade,
wherein the spoiler-shaped supporting element is independent from the shell-shaped spoiler element and is located between at least one spring rail and an inner surface of the shell-shaped spoiler element;
wherein the spoiler-shaped supporting element extends over an entire length of the shell-shaped spoiler element, and
wherein the spoiler-shaped supporting element is directly attached to and contacting the at least two spring rails.

2. The flat wiper blade according to claim 1, wherein the at least one jet or injection strip forms a fastening section, by means of which the spoiler element is retained on the wiper blade.

3. The flat wiper blade according to claim 1, wherein the spoiler-shaped supporting element is formed of a spoiler-shaped hollow profile comprising fastening sections on peripheries of the spring rails external in relation to the wiping rubber, wherein the fastening sections retain the spoiler-shaped supporting element on the spring rails, and wherein the spoiler element spans, with fastening sections, the spoiler-shaped supporting element on the longitudinal sides of the wiper blade or on the fastening sections at this position.

4. The flat wiper blade according to claim 1, wherein the internal supporting element is formed of a spoiler-shaped profile section of the wiping rubber and wherein the spoiler element spans the spring rails with fastening sections on external peripheries in a U-shape or in the manner of a clip, with at least one fastening section being constructed as a jet or injection strip with the at least one injection or washing duct and a large number of injection openings or being designed in one piece with a jet or injection strip presenting the at least one injection or washing duct.

5. The flat wiper blade according to claim 1, wherein the at least one injection or washing duct is arranged above or underneath an adjacent spring rail or at substantially a same level as the adjacent spring rail.

6. The flat wiper blade according to claim 1, wherein, on both sides of a wiper blade adapter serving to fasten the wiper blade on a wiper arm, the at least one spoiler element having the at least one jet or injection strip is provided on the at least one longitudinal side of the wiper blade, and wherein the at least one injection or washing duct on the longitudinal side of the wiper blade is connected to one another by means of a distribution or connecting piece, wherein the connecting piece presents at least one connection for connecting to a line for supplying a washing and cleaning fluid in addition to preferably additional injection openings for application of the cleaning and washing fluid to a vehicle windscreen.

7. The flat wiper blade according to claim 1, wherein the shell-shaped spoiler element is attached on the at least two spring rails.

8. The flat wiper blade according to claim 1, wherein the spoiler-shaped supporting element is attached on the at least two spring rails.

* * * * *